United States Patent
Zhang et al.

(10) Patent No.: US 7,562,210 B2
(45) Date of Patent: Jul. 14, 2009

(54) SYSTEM AND METHOD FOR KEEPING DMI DYNAMIC INFORMATION

(75) Inventors: Wei Zhang, Guangdong (CN); Qin Wu, Guangdong (CN)

(73) Assignees: Hong Fu Jin Precision Industry (ShenZhen) Co., Ltd., Shenzhen, Guangdong Province; Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 576 days.

(21) Appl. No.: 11/309,135

(22) Filed: Jun. 27, 2006

(65) Prior Publication Data

US 2007/0088942 A1    Apr. 19, 2007

(30) Foreign Application Priority Data

Aug. 5, 2005    (CN)    ......................... 2005 1 0036442

(51) Int. Cl.
    *G06F 15/177*    (2006.01)
(52) U.S. Cl. ................. 713/2; 713/1; 713/100
(58) Field of Classification Search ....... 713/1, 713/2, 100
    See application file for complete search history.

(56) References Cited

U.S. PATENT DOCUMENTS

| 6,122,732 A * | 9/2000 | Ahuja ........................... 713/1 |
| 7,000,103 B2 | 2/2006 | Lin |
| 2004/0225875 A1* | 11/2004 | Huang et al. ................... 713/1 |
| 2005/0273525 A1* | 12/2005 | Anderson ..................... 710/36 |
| 2006/0075286 A1* | 4/2006 | Hodge et al. ................... 714/5 |

* cited by examiner

*Primary Examiner*—Dennis M Butler
(74) *Attorney, Agent, or Firm*—Winston Hsu

(57) ABSTRACT

An exemplary system for keeping desktop management interface (DMI) dynamic information is disclosed. The system includes a power supply (1) and a computer (2). The computer includes a central processing unit (CPU) (3), a north bridge chip (4), a south bridge chip (7), a memory (5), and a basic input/output system read-only memory (BIOS ROM) (8). The memory includes a shadow random access memory (RAM) (6), which is configured for storing all kinds of BIOS programs and keeping DMI dynamic information. The BIOS ROM includes a ROM temporary storage (9) and a DMI data storage (10). The ROM temporary storage is configured for storing backed-up DMI dynamic information from the shadow RAM after updating the BIOS of the computer and cleaning up the DMI dynamic information in the DMI data storage. A related method is also disclosed.

4 Claims, 2 Drawing Sheets

SYSTEM AND METHOD FOR KEEPING DMI DYNAMIC INFORMATION

FIELD OF THE INVENTION

The present invention relates to systems and methods for keeping desktop management interface dynamic information, and more particularly to a system and method for keeping desktop management interface dynamic information when the version of a BIOS is updated.

DESCRIPTION OF RELATED ART

Desktop management interface (DMI) is a system that helps to collect information about computers. DMI information can only be collected under a system management basic input/output system (SMBIOS) specification. Both SMBIOS and DMI specifications are drafted by a desktop management task force (DMTF); an industry-led organization that implements technology specifications to ensure open standards. DMI is intended to perform on any platforms or operating systems and to act as the interface between management utility and system components. DMI creates a standard computer system that is easily understood by computer manufacturers and users. Through DMI, users can obtain information about a particular personal computer (PC), including serial number, computer manufacturer, serial port information, as well as other system component information.

DMI can be thought of as a framework for managing and keeping track of hardware and software components in a system of personal computers, e.g. from a central location. Generally speaking, it is necessary to back-up DMI dynamic information when a computer system updates a version of basic input/output system (BIOS) in order to prevent unexpected errors. To do this, the computer system backups the DMI dynamic information from a DMI data storage into a hard disk first, and then updates the BIOS and cleans up the DMI dynamic information in the DMI data storage, and finally recovers the DMI dynamic information from the hard disk into the DMI data storage when the computer system is restarted. The method mentioned above involves transferring critical data too many times, thus it is prone errors.

Therefore, what is needed is a system and method for keeping DMI dynamic information, which can actualize keeping DMI dynamic information securely and swiftly.

SUMMARY OF INVENTION

One embodiment provides a system for keeping desktop management interface (DMI) dynamic information. The system includes a basic input/output system read-only memory (BIOS ROM); a shadow random access memory (RAM) configured for storing all kinds of BIOS programs and DMI dynamic information; and a read only memory (ROM) temporary storage configured in the BIOS ROM, for storing a back-up of the DMI dynamic information from the shadow RAM after updating the BIOS and cleaning up the DMI dynamic information in a DMI data storage configured in the BIOS ROM.

Another embodiment provides a computer-based method for keeping DMI dynamic information. The method includes the steps of: (a) providing a DMI data storage storing the DMI dynamic information, the DMI data storage being configured in a basic input/output system read-only memory (BIOS ROM); (b) backing-up the DMI dynamic information into a shadow random access memory (RAM); (c) providing a read only memory (ROM) temporary storage that is configured in the BIOS ROM; (d) determining whether the information in the ROM temporary storage is the same as the DMI dynamic information in the shadow RAM; (e) backing-up the information in the ROM temporary storage into the DMI data storage, if the information isn't the same as the DMI dynamic information; (f) updating the BIOS and cleaning up the DMI dynamic information in the DMI data storage; (g) determining whether the DMI dynamic information in the shadow RAM is void; and (h) backing-up the DMI dynamic information in the shadow RAM into the ROM temporary storage if the DMI dynamic information in the shadow RAM is not void.

Other objects, advantages and novel features of the embodiments will be drawn from the following detailed description together with the attached drawings, in which:

DETAILED DESCRIPTION

Figure 1:
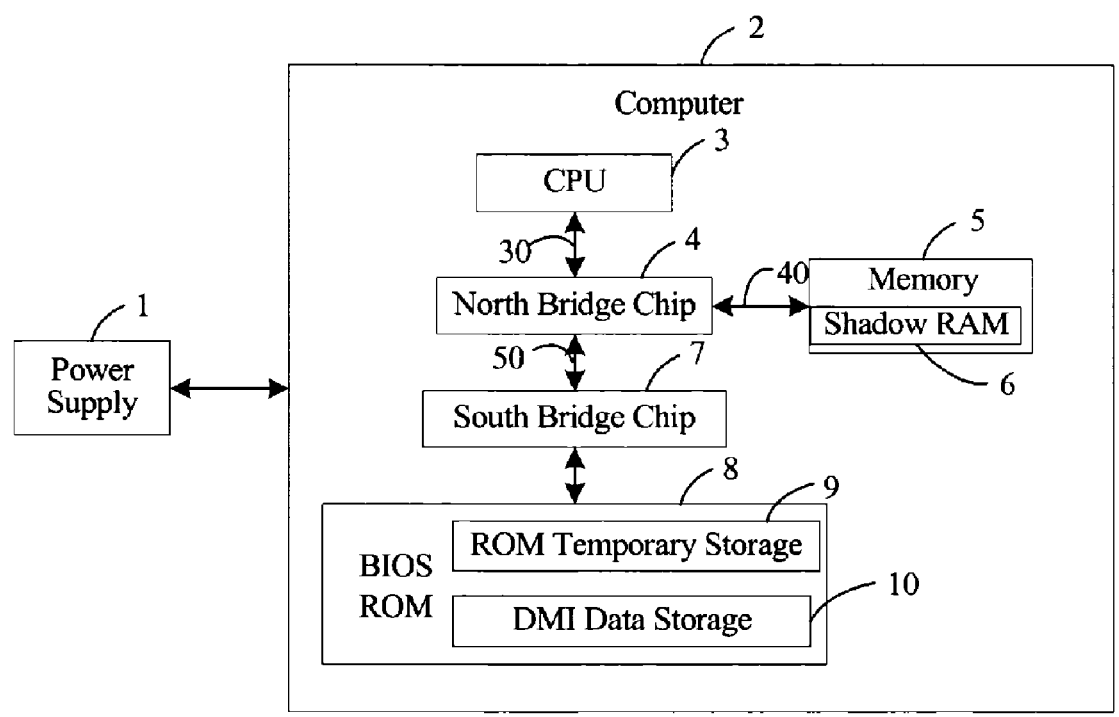
FIG. 1 is a schematic diagram of a hardware configuration of a system for keeping desktop management interface (DMI) dynamic information in accordance with a preferred embodiment.

FIG. 1 is a schematic diagram of a hardware configuration of a system for keeping desktop management interface (DMI) dynamic information in accordance with a preferred embodiment. The system typically includes a power supply 1 and a computer 2.

The computer 2 includes a central processing unit (CPU) 3, a north bridge chip 4, a south bridge chip 7, a memory 5, and a basic input/output system read-only memory (BIOS ROM) 8.

All peripheral devices in the computer 2 are connected to the CPU 3 via corresponding data buses so as to communicate with the CPU 3. The data buses connect the CPU 3 and the peripheral devices on a motherboard of the computer 2 so as to transmit data between the CPU 3 and the peripheral devices.

The CPU 3 is configured for processing and calculating data of the computer 2, and is connected to the north bridge chip 4 via a front side system bus 30. The north bridge chip 4 is connected to the memory 5 by a double data rate (DDR) memory bus 40 for data transmission. The memory 5 includes a shadow random access memory (RAM) 6 that is configured for storing all kinds of BIOS programs and keeping DMI dynamic information when the computer 2 executes a power-on self test (POST) program. The north bridge chip 4 is also connected to the south bridge chip 7 via a peripheral component interconnect (PCI) bus 50. The south bridge chip 7 is a control chip to connect and control the peripheral devices that can be extension interfaces, such as sound cards, network cards, and input devices. The peripheral devices may also be disk controllers to connect storage devices, such as hard disk drives, floppy disk drives, and the like.

The BIOS ROM 8 is connected with the south bridge chip 7, and includes a ROM temporary storage 9 and a DMI data storage 10. The ROM temporary storage 9 is configured for storing backed-up DMI dynamic information from the shadow RAM 6 after the computer 2 finishes updating the BIOS of the computer 2 and cleaning up the DMI dynamic information in the DMI data storage 10. The DMI data storage 10 is configured for storing the DMI dynamic information. The DMI dynamic information creates a standard computer system that is easily understood by computer manufacturers and users, and acts as the interface between management utility and system components.

Figure 2:
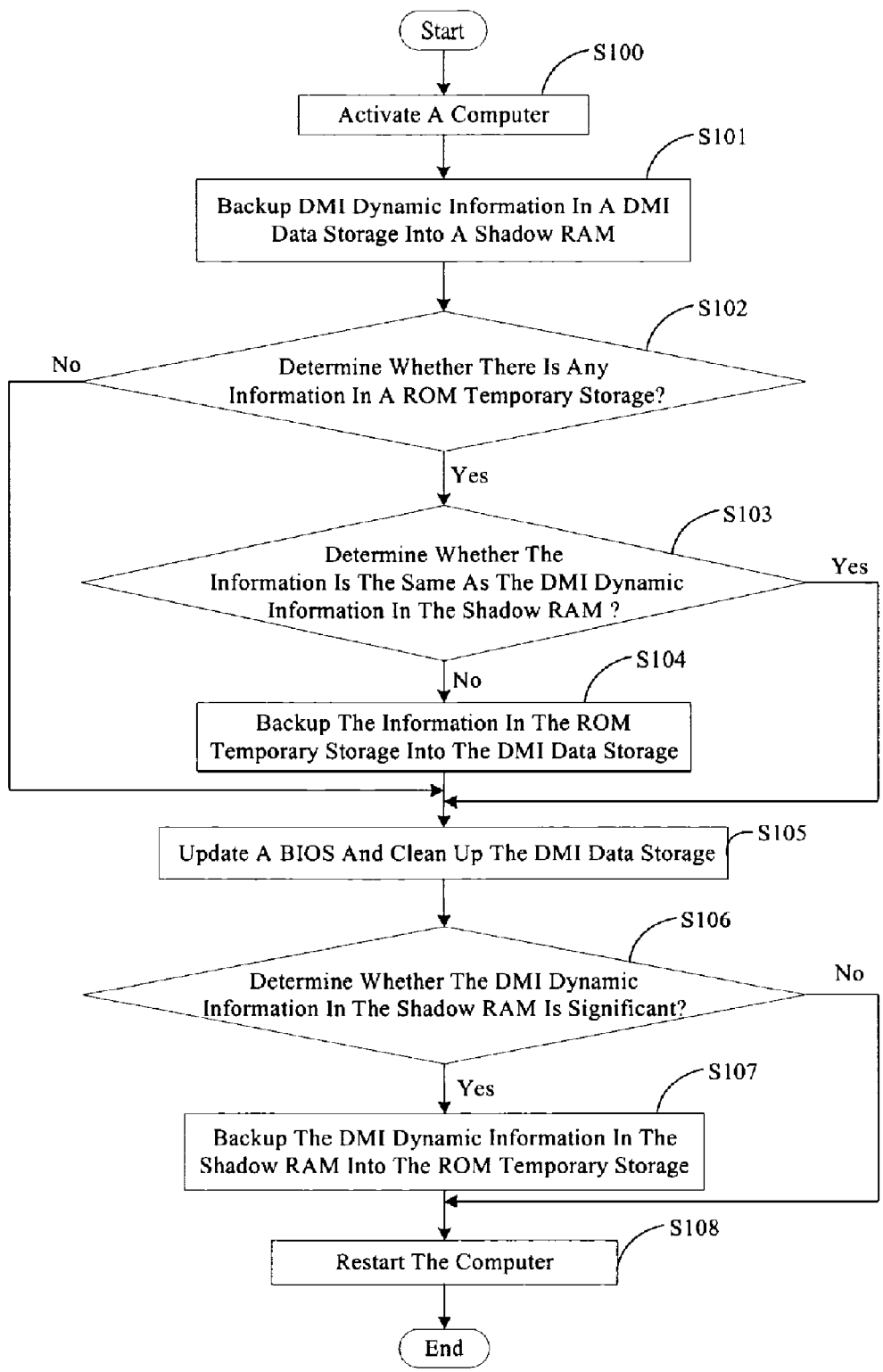
FIG. 2 is a flow chart of a preferred method for keeping DMI dynamic information by utilizing the system of FIG. 1.

FIG. 2 is a flow chart of a preferred method for keeping DMI dynamic information by utilizing the system of FIG. 1. In step S100, the computer 2 is activated. In step S101, the computer 2 executes the POST program including a BIOS detection for peripherals, and backups DMI dynamic information in the DMI data storage 10 into the shadow RAM 6. In step S102, the computer 2 determines whether there is any information in the ROM temporary storage 9, if there isn't any information in the ROM temporary storage 9, the procedure goes to step S105 (described in detail hereinafter). The information in the ROM temporary storage 9 are backed-up DMI dynamic information from the shadow RAM 6 after the computer 2 finishes updating the BIOS of the computer 2 and cleaning up the DMI dynamic information in the DMI data storage 10. If there is any information in the ROM temporary storage 9, in step S103, the computer 2 determines whether the information in the ROM temporary storage 9 is the same as the DMI dynamic information in the shadow RAM 6. If the information is the same as the DMI dynamic information, the procedure goes to step S105. If the information isn't the same as the DMI dynamic information in the shadow RAM 6, in step S104, the computer 2 backups the information in the ROM temporary storage 9 into the DMI data storage 10.

In step S105, the computer 2 executes an updating tool to update the BIOS and clean up the DMI dynamic information in the DMI data storage 10. In step S106, the computer 2 determines whether the DMI dynamic information in the shadow RAM 6 are significant. Herein, non-void information means significant. Otherwise, void information means insignificant. For example, if the DMI dynamic information is a serial number such that each bit equals 0, this indicates that the serial number is insignificant. If the DMI dynamic information in the shadow RAM 6 is significant, in step S107, the computer 2 backups the DMI dynamic information in the shadow RAM 6 into the ROM temporary storage 9. In step S108, the computer 2 is restarted. If the DMI dynamic information in the shadow RAM 6 is insignificant in step S106, the procedure goes to step S108 directly.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A system for keeping desktop management interface (DMI) dynamic information, the system comprising:
    a basic input/output system read-only memory (BIOS ROM);
    a shadow random access memory (RAM) configured for storing all kinds of BIOS programs and DMI dynamic information; and
    a read only memory (ROM) temporary storage configured in the BIOS ROM, for storing a back-up of the DMI dynamic information from the shadow RAM after updating the BIOS and cleaning up the DMI dynamic information in a DMI data storage configured in the BIOS ROM.

2. The system according to claim 1, wherein the DMI data storages is configured for storing the DMI dynamic information.

3. A computer-based method for keeping desktop management interface (DMI) dynamic information, the method comprising the steps of:
    providing a DMI data storage storing the DMI dynamic information, the DMI data storage being configured in a basic input/output system read-only memory (BIOS ROM);
    backing-up the DMI dynamic information into a shadow random access memory (RAM);
    providing a read only memory (ROM) temporary storage that is configured in the BIOS ROM;
    determining whether the information in the ROM temporary storage is the same as the DMI dynamic information in the shadow RAM;
    backing-up the information in the ROM temporary storage into the DMI data storage, if the information isn't the same as the DMI dynamic information;
    updating the BIOS and cleaning up the DMI dynamic information in the DMI data storage;
    determining whether the DMI dynamic information in the shadow RAM is void; and
    backing-up the DMI dynamic information in the shadow RAM into the ROM temporary storage if the DMI dynamic information in the shadow RAM is not void.

4. The method according to claim 3, wherein the information in the ROM temporary storage is a back-up of the DMI dynamic information from the shadow RAM after finishing updating the BIOS and cleaning up the DMI dynamic information in the DMI data storage.

\* \* \* \* \*